US012092568B2

(12) United States Patent
Huemer et al.

(10) Patent No.: US 12,092,568 B2
(45) Date of Patent: Sep. 17, 2024

(54) OPTICAL MEASURING UNIT AND OPTICAL MEASURING METHOD FOR OBTAINING MEASUREMENT SIGNALS OF FLUID MEDIA

(71) Applicant: Meon Medical Solutions Gmbh & Co KG, Graz (AT)

(72) Inventors: Herfried Huemer, Feldbach (AT); Arnold Bartel, Graz (AT); Stefan Gulo, Riederhof (AT); Patrick Kraus-Füreder, Graz (AT); Robert Scholz-Mareich, Graz (AT); Wolfgang Sprengers, Vasoldsberg (AT)

(73) Assignee: Meon Medical Solutions Gmbh & Co KG, Graz (AT)

( * ) Notice: Subject to any disclaimer, the term of this patent is extended or adjusted under 35 U.S.C. 154(b) by 839 days.

(21) Appl. No.: 17/049,833

(22) PCT Filed: Apr. 12, 2019

(86) PCT No.: PCT/AT2019/060123
§ 371 (c)(1),
(2) Date: Oct. 22, 2020

(87) PCT Pub. No.: WO2019/204840
PCT Pub. Date: Oct. 31, 2019

(65) Prior Publication Data
US 2021/0239604 A1    Aug. 5, 2021

(30) Foreign Application Priority Data

Apr. 23, 2018    (AT) .............................. A 50340/2018

(51) Int. Cl.
*G01N 21/31* (2006.01)
*B01L 3/00* (2006.01)
*G01N 21/03* (2006.01)

(52) U.S. Cl.
CPC ............ *G01N 21/31* (2013.01); *B01L 3/5085* (2013.01); *G01N 21/0303* (2013.01);
(Continued)

(58) Field of Classification Search
CPC ............... G01N 21/31; G01N 21/0303; G01N 21/0389; G01N 21/253; G01N 21/51;
(Continued)

(56) References Cited

U.S. PATENT DOCUMENTS 4,234,539 A    11/1980 Ginsberg et al.
4,498,780 A    2/1985 Taiichi et al.
(Continued)

FOREIGN PATENT DOCUMENTS

| AT | 519631 B1 | 1/2013 |
| EP | 3182096 A1 | 6/2017 |
| WO | 2010122203 A1 | 10/2010 |

*Primary Examiner* — Edmond C Lau
*Assistant Examiner* — Carlos Perez-Guzman
(74) *Attorney, Agent, or Firm* — Dykema Gossett PLLC

(57) ABSTRACT

Aspects of the present disclosure are directed to, for example, an optical measurement unit for obtaining measurement signals from liquid media which are present in cuvettes lined up next to one another. In one embodiment, the optical measurement unit includes a light-supplying unit for emitting an inlet radiation into the cuvettes, and a detection unit for detecting a measurement radiation exiting from the cuvettes and for converting the measurement radiation into an electrical measurement signal. In such an embodiment, the light-supplying unit has a plurality of LED light sources which emit in a spectrally different manner in the UV/VIS/NIR wavelength range, and wherein the detection unit includes at least one photodiode fixedly assigned to each cuvette of a cuvette array.

28 Claims, 10 Drawing Sheets

(52) U.S. Cl.
CPC ............... *B01L 2300/0654* (2013.01); *B01L 2300/0829* (2013.01); *B01L 2300/0832* (2013.01); *B01L 2300/168* (2013.01); *G01N 2021/0389* (2013.01); *G01N 2201/062* (2013.01); *G01N 2201/0633* (2013.01)

(58) Field of Classification Search
CPC ..... G01N 2201/062; G01N 2201/0633; G01N 2201/0627; B01L 3/5085; B01L 2300/0654; B01L 2300/0829; B01L 2300/0832; B01L 2300/168
See application file for complete search history.

(56) References Cited

U.S. PATENT DOCUMENTS

| | | |
|---|---|---|
| 5,216,488 A | 6/1993 | Tguunanen et al. |
| 5,307,144 A | 4/1994 | Tamura et al. |
| 8,064,062 B2 | 11/2011 | Ogawa |
| 8,675,187 B2 | 3/2014 | Harada et al. |
| 8,696,990 B2 | 4/2014 | Meller et al. |
| 2008/0158552 A1* | 7/2008 | Tokunaga ............ G01N 21/253 356/73 |
| 2013/0301051 A1 | 11/2013 | Pogosyan et al. |
| 2016/0123882 A1* | 5/2016 | Gilmore ................ G01N 21/85 250/227.11 |
| 2016/0160260 A1* | 6/2016 | Marshall ................ C12Q 1/06 435/39 |
| 2016/0161409 A1* | 6/2016 | Ozcan ............... G01N 21/6458 250/226 |
| 2017/0176478 A1* | 6/2017 | Harbers .......... G01N 35/00693 |
| 2017/0322133 A1* | 11/2017 | Trainer ............... G01N 21/474 |
| 2018/0088025 A1* | 3/2018 | Haghgooie ........... G01N 21/03 |
| 2018/0292319 A1* | 10/2018 | Battrell .................... B01L 7/52 |
| 2021/0072148 A1* | 3/2021 | Gillespie ........... G01N 21/0303 |

* cited by examiner

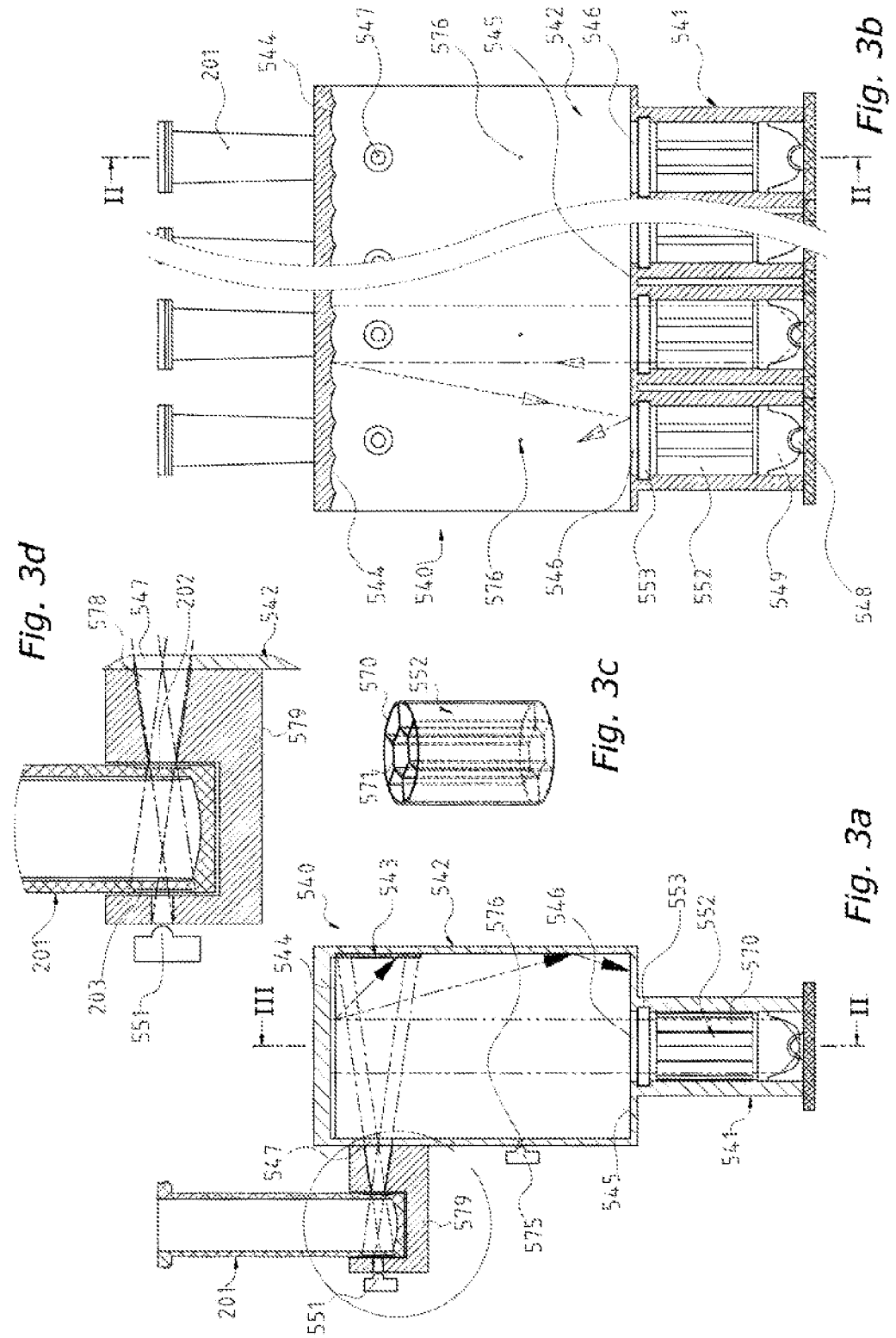

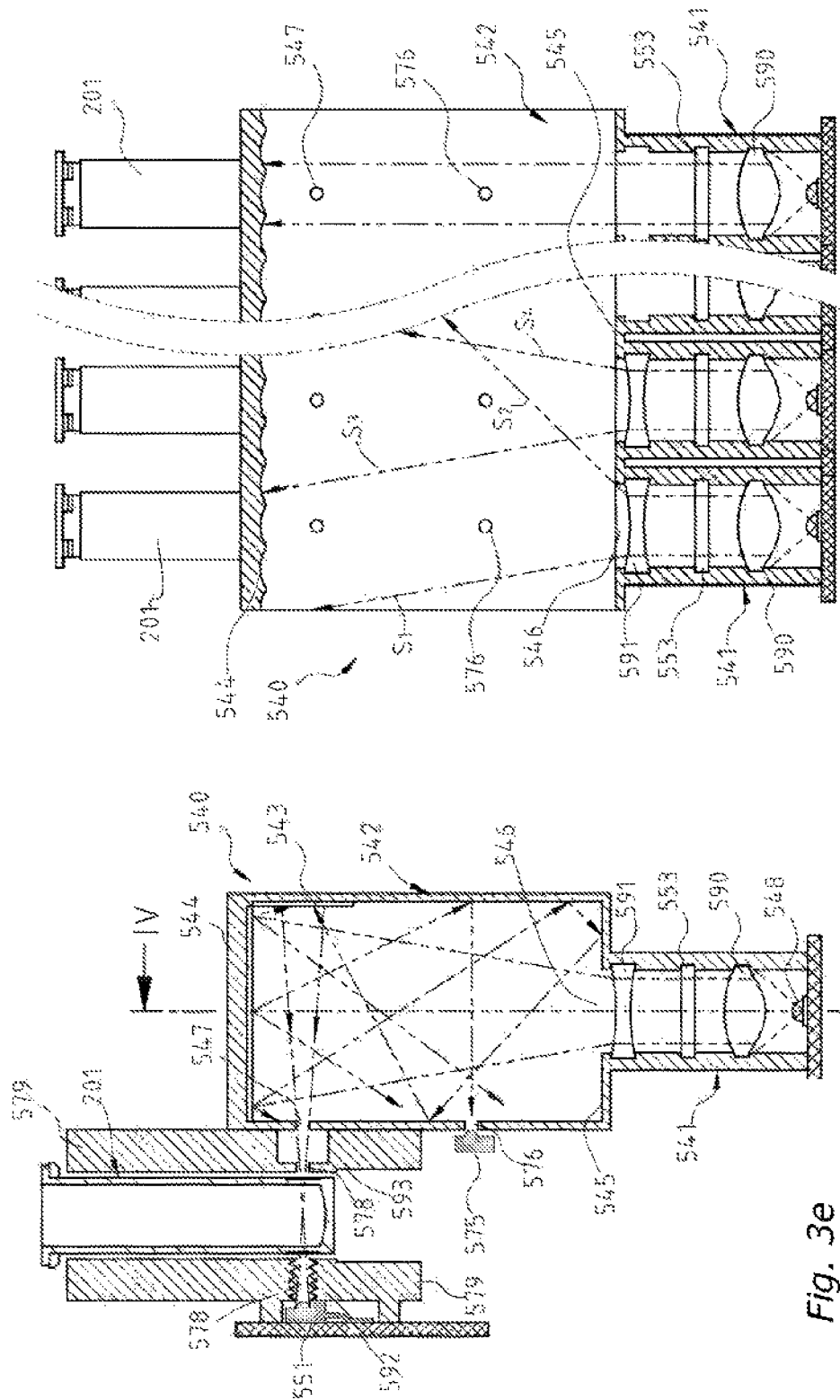

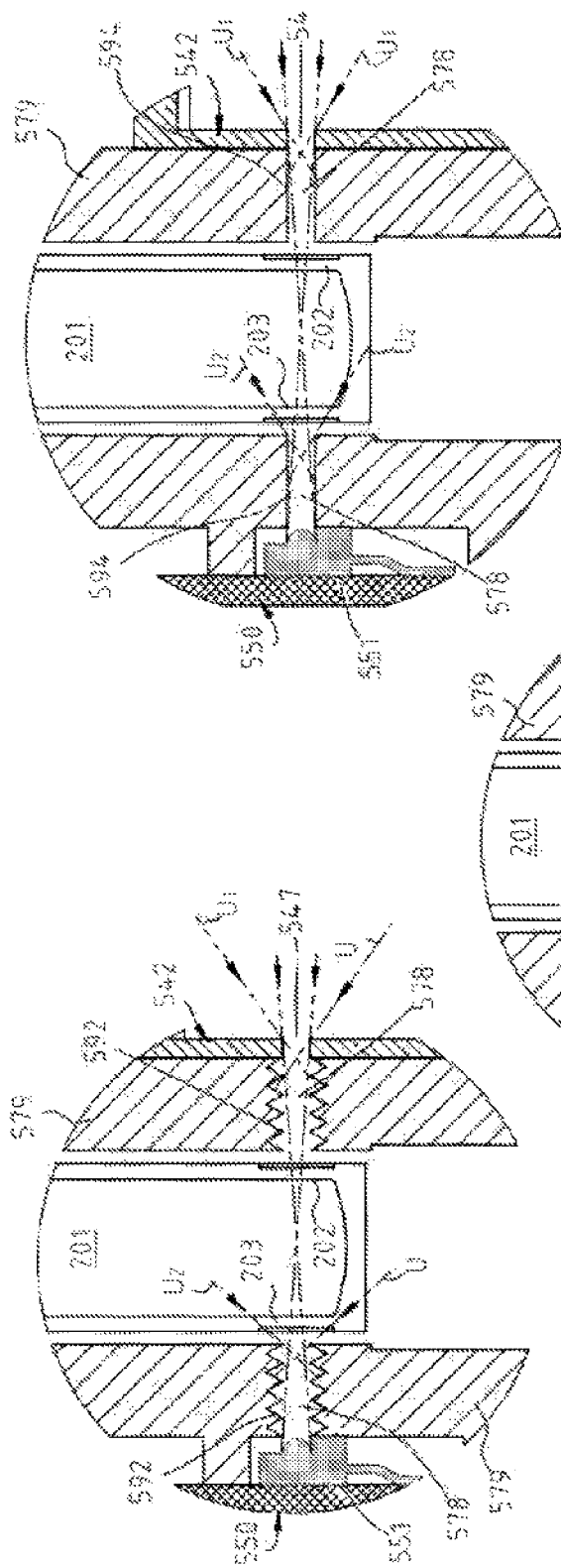
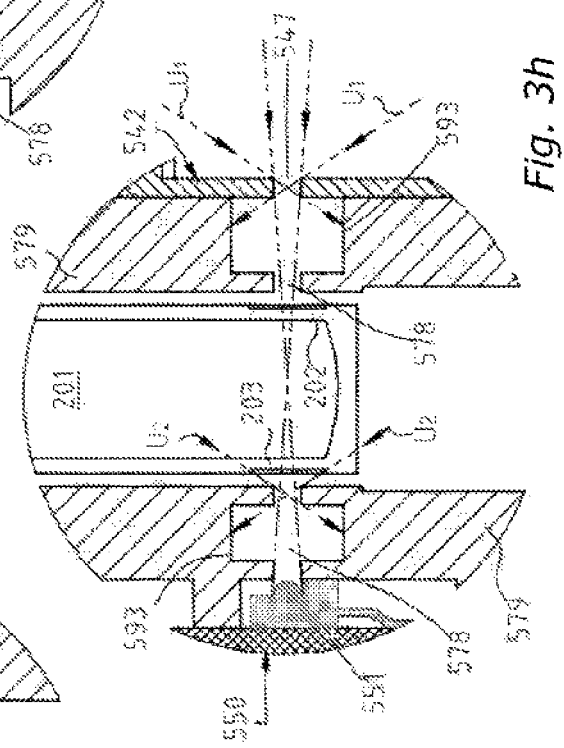
Fig. 3g
Fig. 3h
Fig. 3i

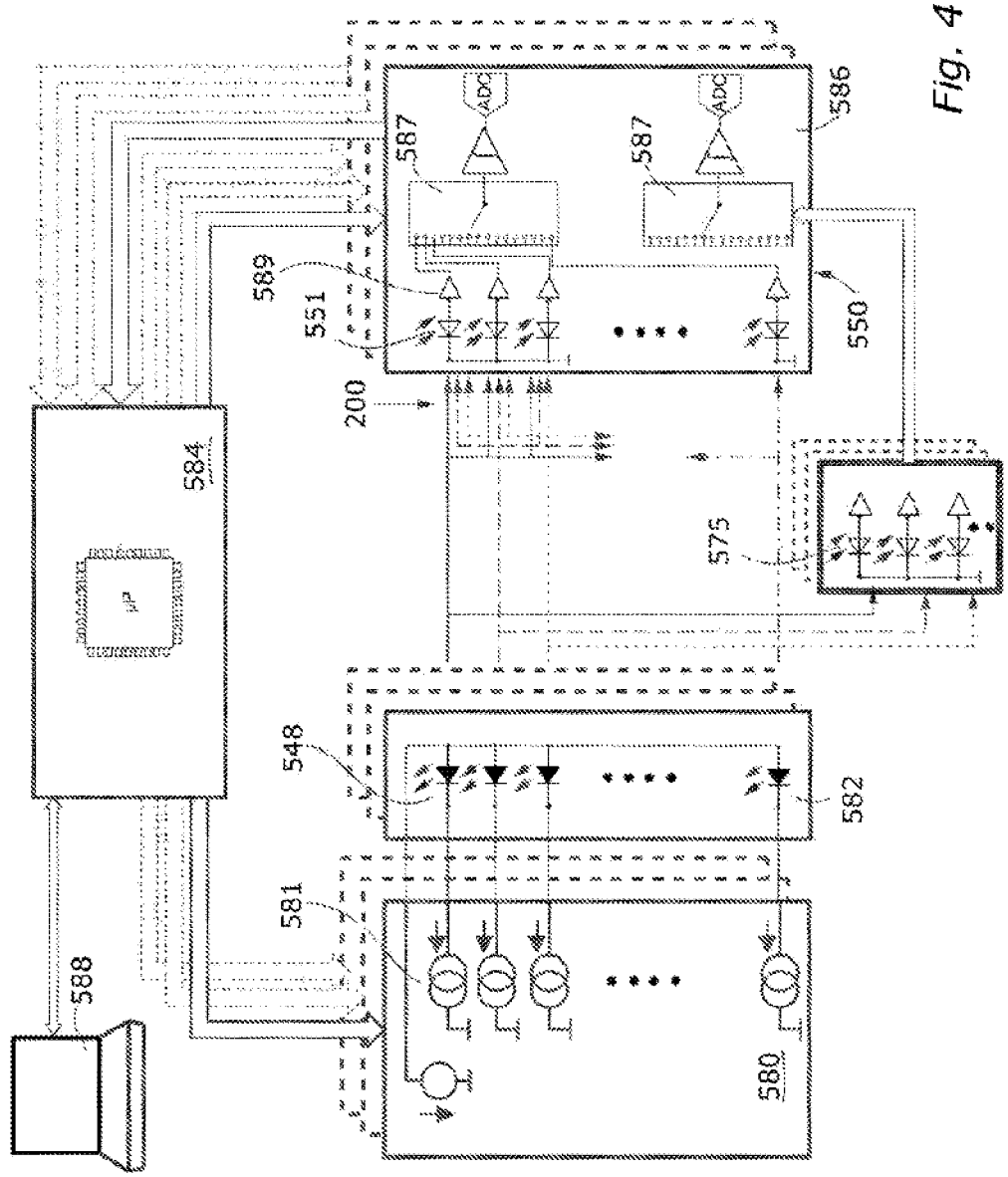

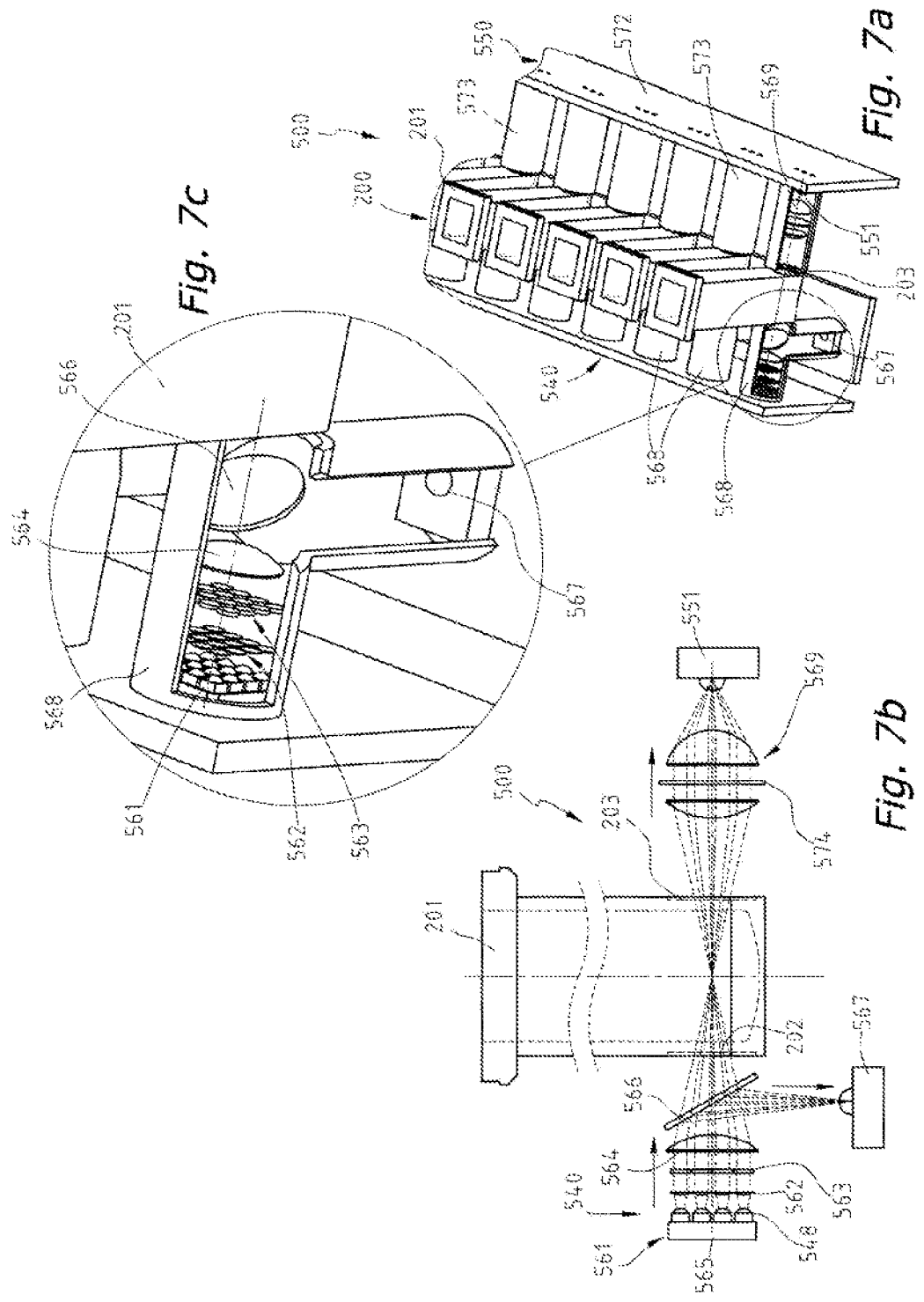

OPTICAL MEASURING UNIT AND OPTICAL MEASURING METHOD FOR OBTAINING MEASUREMENT SIGNALS OF FLUID MEDIA

CROSS-REFERENCE TO RELATED APPLICATIONS

This application is a national stage filing based upon International application No. PCT/AT2019/060123, filed 12 Apr. 2019, which claims the benefit of priority to Austria application No. A 50340/2018, filed 23 Apr. 2018.

BACKGROUND

The invention relates to an optical measurement unit for obtaining measurement signals from liquid media which are present in cuvettes lined up next to one another, comprising a light-supplying unit for emitting an inlet radiation into the cuvettes, and comprising a detection unit for detecting a measurement radiation exiting from the cuvettes and for converting the measurement radiation into an electrical measurement signal. The invention also relates to an optical measurement method for obtaining measurement signals from liquid media.

In optical measurement units for obtaining measurement signals from liquid media, different types of measurement are used:

Photometry

The physical effect on which photometric measurement is based is the absorption of light of particular wavelengths by particular substances present in a liquid. The resulting reduction in the intensity of the light passing through the cuvette is detected using measurement technology, and permits a quantitative determination of the concentration of a substance by taking the following equations into account:

$$T = I/I_0 \quad \text{(Eq 1)}$$

$$E = -\log T = \log(I_0/I) \quad \text{(Eq 2)}$$

$$E = \varepsilon \cdot c \cdot d \quad \text{(Eq 3) Lambert-Beer's law}$$

where T ... transmission
E ... extinction
$I_0$ ... intensity in the absence of the light-absorbing substance
I ... intensity in the presence of the light-absorbing substance
c [mol/l] ... molar concentration
d [cm] ... thickness of the absorbent liquid layer
$\varepsilon$ [1 $mol^{-1}$ $cm^{-1}$] ... molar extinction coefficient (substance-dependent variable)

The molar concentration c can thus be calculated directly from the result of an extinction or transmission measurement. This type of measurement is used in chemical and enzymatic reactions to determine the molar concentration of particular analytes present in the sample (blood plasma, urine, etc.). In this case, light-absorbing substances (dyes) appear or disappear, and the molar concentration of the analyte to be determined is then deduced from the extinction or changes in the extinction thereof.

In the field of clinical chemical analysis, numerous parameters are determined using photometric methods, for example the determination of enzymes (AP, GOT, GPT, γ-GT, amylase, CK), electrolytes ($Na^+$, $K^+$, $Ca^{2+}$, $Cl^-$, $Mg^{2+}$), organ-specific substances (heart, liver, kidney) and numerous metabolic variables (bilirubin, total cholesterol, HDL and LDL cholesterol, triglycerides, glucose, uric acid, creatinine, urea and lactate).

Turbidimetry and Nephelometry

This type of measurement is used in homogeneous immunoassays, wherein particular analytes, such as for example metabolites, enzymes, peptides or proteins, are reacted with antibodies. This results in larger structures, which cause increased light scattering or turbidity of the reaction mixture.

While in the case of transmission measurement the intensity of the light beam passing through decreases as the analyte concentration increases due to the increasing turbidity, at a detection angle of for example 90° the intensity of the scattered light beam increases as the turbidity increases.

The turbidity measurement in the form of the transmission measurement is referred to as turbidimetry. The associated measurement device is referred to as a turbidimeter. The scattered light measurement taking place at an angle of, for example, 90° to the light beam passing through is referred to as nephelometry, and the associated measurement device is referred to as a nephelometer.

For a better understanding of the invention, a few essential technical terms used in the present application will be defined in greater detail:

Liquid Medium:

This term refers to liquid samples, liquid reagents, or mixtures and/or reaction mixtures thereof.

Sample:

The analysis sample (usually called simply sample or substance sample) refers to the entirety of the material to be analyzed.

Analyte:

Analytes are those substances which are contained in a sample and about which information is to be obtained during a chemical analysis, for example with regard to the molar concentration thereof, that is to say which are to be analyzed.

Reagent:

The term reagent denotes a substance which exhibits a specific reaction upon contact with certain other substances present in a sample. The addition of a reagent to a sample leads to a chemical reaction, thereby bringing about a characteristic color change which enables conclusions to be drawn about the presence or absence and molar concentration of particular analytes in the sample.

Cuvette:

A cuvette in the sense of the present invention refers to a temperature-controllable vessel, which is closed on all sides and is open at the top, for holding sample liquids and reagent liquids and the resulting reaction mixtures and is used to measure the reaction mixtures by means of photometric and/or luminescence-optical methods. A cuvette in the sense of the present invention has at least one window which is arranged in a side wall of the cuvette and which is transparent for the optical measurement method used, or is optically transparent as a whole.

Stationary Cuvette Array:

This refers to a plurality of cuvettes lined up next to one another, which are arranged in a stationary manner and are not moved during normal measurement operation.

Optical Elements for Collimation:

These are optical elements for creating a beam that is as parallel as possible. In principle, the light from a more or less punctiform source is transformed into a parallel ray bundle. Optical elements which align in a substantially parallel manner the light coming from an LED are, for example, converging lenses, TIR lenses, parabolic mirrors, and diaphragm arrangements.

Optical Elements for Filtering:

These are optical components, in particular interference filters, for filtering the transmitted light in a wavelength-dependent and/or frequency-dependent manner, that is to say in a color-dependent manner for visible light. These components are usually established as dielectric layers on a thin carrier. Since the wavelength-dependent transmittance depends on the angle of incidence of the light, it is advantageous if the light beams impinging on the filter element run as parallel as possible and are oriented parallel to the optical axis.

Use is made of notch filters, longpass filters, shortpass filters, bandpass filters and dichroic interference filters. Particular preference is given to bandpass filters since these have a high transmittance for a particular wavelength band while absorbing shorter or longer wavelengths.

Condenser or Condenser Lenses:

This is an arrangement of one to two lenses which introduce the largest possible portion of the light from an LED into a cuvette, or is such an arrangement which directs the largest possible portion of the light coming from the cuvette onto a photodiode.

PRIOR ART

U.S. Pat. No. 8,675,187 B2 (Hitachi) describes an optical measurement unit for obtaining measurement signals from liquid media, and an analysis system equipped therewith. As shown in FIG. 1a of the present application, one of multiple reaction vessels 24 arranged in a circular manner on a turntable 23 is immersed in a temperature bath 25, which is filled with water 26 at a constant temperature. A photometer 27, which is fixedly arranged in the temperature bath 25, has an LED light source 28, the light from which is irradiated into the sample 31 present in the reaction vessel 24 by means of a condenser lens 29 and a deflecting mirror 30. A semiconductor laser may also be used as the light source. A photodetector 32 of the photometer 27 is arranged on the opposite side of the reaction vessel 24. Diaphragms 34 for the inlet and outlet radiation are provided on the inlet side and on the outlet side of the reaction vessel 24 at the measurement position 33 of the photometer 27. One disadvantage is the mechanical and metrological complexity associated with reaction vessels which are arranged in a circular manner on a turntable, since the individual reaction vessels 24 have to be moved into a measurement position of the photometer 27 in order to measure the samples.

US 2013/0301051 A1 (Pogosyan) describes a cost-effective, portable photometer which—as shown in FIG. 1b of the present application—has a plurality of LEDs of different wavelengths as the light sources 35 and a photodiode or a photomultiplier as the detector 36. The photometer can be used to analyze chemical, biological or pharmaceutical samples which are located in a sample holder 37 between the light sources 35 and the detector 36. The light from the light sources 35 is directed onto a light-scattering surface 39—optionally after passing through an interference filter 38—and passes through a collimator lens 40 and a slit diaphragm 41 in order to reach the sample present in the sample holder 37. As shown, the detector 36 can be pivoted from a first position to a second position. In the illustrated geometry, a collimator lens functions optimally if the scattering surface is selected to be very small, almost punctiform, but this reduces the light output.

U.S. Pat. No. 8,064,062 B2 (Beckmann) discloses—as shown in FIG. 1c of the present application—a photometer with a stationary LED array comprising the light sources L1 to L5 and a stationary detector array comprising the photodiodes R1 to R5, wherein one photodiode is assigned to each light source. The cuvettes C located on a turntable are arranged between the LED array and the detector array. During a rotational movement of the cuvettes C in the direction of the arrow, the optical beam paths are crossed and the light of the different wavelengths λ1 to λ5 can be successively applied to the samples in the cuvettes C.

AT 510 631 B1 (SCAN Messtechnik) claims a spectrometer having multiple LEDs as the light source 44, as shown in FIG. 1d of the present application. The spectrometer is used to analyze the contents of a fluid 42, by means of the light source 44 and a detector 45, wherein the light from the light source 44 having a predefined spectral range is passed through an inlet window 47, through the fluid 42 to be examined, and through an outlet window 48 to the detector 45. The light source 44 is formed by a plurality of LEDs 49 which are arranged in a mount 50 and which are connected to control electronics 43, said LEDs being designed to emit light of different wavelength ranges within the predefined spectral range. The control electronics 43 are designed to actuate the light-emitting diodes 49 in sequence, wherein a compensation detector 51, which is connected to the control electronics 43, is arranged opposite the light-emitting diodes 49 in the mount 50. A lens 46, a diaphragm 52 and a converging lens 53 are arranged in the beam path between the light source 44 and the inlet window 47. In order to measure the scattered light of the fluid to be analyzed, a further detector 54 may be arranged transversely to the measurement radiation.

WO 2010/122203 A1 (Biosystems) discloses a photometer, which is based on an arrangement of multiple LEDs as the light source, for measuring the absorption and turbidity of a sample present in a cuvette. In this case, the light from the individual LEDs is coupled into the beam path upstream of the sample by means of a beam splitter together with a bandpass filter. In addition, a reference photodiode is arranged on the light source side. A photodiode is arranged in the beam path downstream of the sample, on the detection side. The individual cuvettes are moved past the photometer. Disadvantageously, the light source is of very complex construction and consists of many individual components. In addition, the light from the LEDs located further away from the cuvette has to pass through multiple beam splitters, which leads to intensity losses.

U.S. Pat. No. 4,234,539 (Coulter Electronics) describes an automatic analyzer having turntables for sample vessels, reagent vessels and reaction vessels (cuvettes), with pipetting arms installed therebetween for transferring the media. Arranged concentrically in relation to a cuvette turntable is a rotor, on which pairs of light sources and photodetectors which are positioned fixedly with respect to one another are arranged. Upon suitable positioning and/or rotation, the individual cuvettes come to lie between the light source and the photodetector. In an alternative embodiment, a single light source is positioned centrally on the axis of rotation and the photodetectors are located (as seen in the radial direction) on the opposite side of the cuvettes. While the cuvette turntable then rotates only slowly, the rotor having the light source executes a much faster rotational movement, which leads to a significant increase in the measurement frequency. Furthermore, the rotor may have a filter wheel with different filters which can be brought into the beam path between the central light source and the cuvette. However, the rotor must stop at each cuvette, after which the respective filter is selected by rotating the filter wheel. The above-described disadvantages of turntable systems and of cuvettes attached to turntables nevertheless also exist here.

EP 2 309 251 A1 (Siemens Healthcare) discloses an automatic analyzer having stationary sample vessels or cuvettes which are present in a circular or linear arrangement, wherein the optical measurement unit is formed on a rotatable device such as to be movable along the sample vessels. According to one embodiment variant, the rotatable device, which carries the light source in the form of an LED and the photodetector in the form of a photodiode, may be arranged below the receptacle for the sample vessels, as a result of which it is possible at all times to access the sample vessels by means of a gripping arm. The rotatable device may also have a plurality of LEDs of different wavelengths and a plurality of photodiodes, so that the samples can be measured at multiple wavelengths. The photodiodes may be replaced by a CCD element.

SUMMARY OF THE INVENTION

The object of the invention is to improve an optical measurement unit and an optical measurement method for obtaining measurement signals from liquid media which are present in cuvettes lined up next to one another, such that a plurality of measurements at different wavelengths can be carried out during the course of the chemical reactions in the individual cuvettes and in quick temporal succession, the aim being to reduce as far as possible the kinematic complexity brought about by translational and/or rotational relative movements between individual components of the measurement system.

An optical measurement unit according to the invention for obtaining measurement signals from liquid media which are present in cuvettes lined up next to one another, each cuvette having a lateral inlet window and at least one lateral outlet window, comprises the following components:
   a light-supplying unit which is suitable for emitting spectrally different inlet radiations in temporal succession into the inlet window of each cuvette, the light-supplying unit having a plurality of LED light sources which emit in a spectrally different manner in the UV/VIS/NIR wavelength range, and
   a detection unit which is suitable for detecting a measurement radiation exiting from the at least one outlet window of each cuvette and for converting this into an electrical measurement signal,
   wherein the cuvettes lined up next to one another form a stationary cuvette array, and the detection unit of the optical measurement unit has a plurality of photodiodes, at least one photodiode being fixedly assigned to each outlet window of each cuvette of the cuvette array.

It is particularly advantageous that the cuvettes are arranged as an immovable, stationary cuvette array, wherein the individual detectors (transmitted-light detector (for photometric and turbidimetric measurements) and/or scattered-light detector (for nephelometric measurements)) are fixedly assigned to each cuvette, and that the light exiting from the individual cuvettes—that is to say also any dark signals and possibly incident ambient light—can be measured from each cuvette in a temporally unlimited manner for the purpose of correction. It is thus not necessary to measure when moving past the detectors, or to position a detector sequentially in front of a plurality of cuvettes in stop-and-go operation. As a result, more accurate measurement results can be obtained in very short time intervals, and measurement processes are made much more flexible.

According to a first embodiment variant of the invention, the light-supplying unit has at least one stationary light distributor device which distributes the light from the individual LED light sources among the individual cuvettes of the cuvette array, wherein the light distributor device has a cavity, the inner surfaces of which are designed to be at least partially mirrored and/or diffusely reflective, and wherein the light distributor device has, for each LED light source, an inlet opening for feeding the light into the cavity, and wherein the light distributor device has, for each cuvette of the cuvette array, an outlet opening for feeding the light into the cuvette.

This is a compact, cost-effective variant, since the light distributor device, which accommodates a plurality of LED light sources of different wavelength, is assigned in a stationary manner to a row of cuvettes. In the case of cuvette arrays having a large number of cuvettes, the stationary cuvette array may be segmented, wherein a separate light distributor device is fixedly assigned to each segment. Overall, therefore, this results in an optical measurement unit which has no moving components.

For better distribution of the light irradiated into the light distributor device by the individual LED light sources of different wavelength, the inner surface of the light distributor device that is located opposite the inlet openings of the LED light sources is preferably designed to be corrugated and reflective. Although different light paths may occur between individual LED light sources and cuvettes, it is possible on account of the constant geometric conditions for intensity differences to be compensated by calculation, by parameterization of the hardware setup and/or by calibration measurements.

In order to homogenize the measurement radiation entering the cuvettes, the inner surface of the light distributor device that is located opposite the outlet openings to the cuvettes is designed to be diffusely reflective.

According to a second embodiment variant of the invention, the light-supplying unit has at least one unidimensional, rod-shaped light source array comprising a plurality of LED light sources, which light source array is oriented along the stationary cuvette array and is movable along the stationary cuvette array such that each LED light source of the light source array can be assigned to each cuvette of the stationary cuvette array.

This variant benefits from the fact that, on the detector side, the photodiodes fixedly assigned to the individual cuvettes of the stationary cuvette array are present as a stationary, linear photodiode array and are preferably arranged on a common circuit board. The slight disadvantage of a rod-shaped light source array which is movable along the stationary cuvette array is balanced out by cost-effective manufacture (only one light source array for a plurality of cuvettes).

According to a third embodiment variant of the invention, the LED light sources of the light-supplying unit are arranged as a 2D LED array, wherein a stationary 2D LED array is fixedly assigned to each cuvette of the stationary cuvette array.

This variant enjoys the advantages of the first variant described above, since the optical measurement unit can be realized without moving components and each cuvette has an individual photometer, having a fixedly assigned 2D LED array as the light source and a fixedly assigned photodiode as the detector.

A variant which offers cost savings over the third variant is characterized in that the light-supplying unit, in a manner similar to the third variant, is designed as a 2D LED array which, in a manner similar to the second variant, is designed to be movable along the stationary cuvette array. To further increase the measurement frequency at individual cuvettes in the case of long cuvette arrays, it is also possible for a plurality of 2D LED arrays to be designed to be movable along individual segments of the stationary cuvette array. This fourth variant is more cost-effective than the third variant since a 2D LED array is not required for each cuvette.

An optical measurement method according to the invention for obtaining measurement signals from liquid media, in particular in connection with the first embodiment variant of the invention, is characterized by the following steps:

holding the liquid media in cuvettes which are lined up next to one another and which form a stationary cuvette array, supplying an inlet radiation, which radiates into the cuvettes, by means of at least one stationary light distributor device which optically contacts at least one segment of the cuvette array, wherein light is irradiated into the light distributor device in temporal succession by a plurality of LED light sources which emit in a spectrally different manner in the UV/VIS/NIR wavelength range, and is distributed among the individual cuvettes, and detecting the measurement radiation exiting from the cuvettes by means of at least one photodiode—fixedly assigned to each cuvette—of a stationary detection unit.

The measurement radiation exiting from the cuvettes is converted into an electrical measurement signal and, after being suitably prepared, is displayed in a display unit.

BRIEF DESCRIPTION OF THE DRAWINGS

The invention will be explained in greater detail below on the basis of exemplary embodiments, which are partially schematic and in which:

FIG. 3a shows a sectional illustration of the light-supplying unit according to FIG. 2a along the line II-II in FIG. 3b, FIG. 3b shows a sectional illustration of the light-supplying unit according to FIG. 2a along the line III-III in FIG. 3a, FIG. 3c shows a three-dimensional detail illustration of a tubular body of the light-supplying unit according to FIG. 2a, FIG. 3d shows an enlarged detail illustration from FIG. 3a, FIG. 3e shows a variant of the light-supplying unit in a sectional illustration according to FIG. 3a, FIG. 3f shows the variant of the light-supplying unit according to FIG. 3e in a sectional illustration along the line IV-IV in FIG. 3e, FIG. 3g to FIG. 3i show three different detail variants of the beam guidance on the inlet side and on the outlet side of a cuvette in a sectional illustration according to FIG. 3f, FIG. 4 shows a block diagram regarding the electronic actuation of the optical measurement unit according to FIG. 2a, FIG. 5a shows a first diagram to illustrate a measurement process (modes 1 and 2), FIG. 7a shows a third embodiment variant of an optical measurement unit according to the invention for obtaining measurement signals from liquid media, in a three-dimensional view, FIG. 7b shows an enlarged sectional illustration through the axis of a cuvette, normal to the cuvette array, and FIG. 7c shows an enlarged detail illustration from FIG. 7a.

DETAILED DESCRIPTION

Figure 1B:
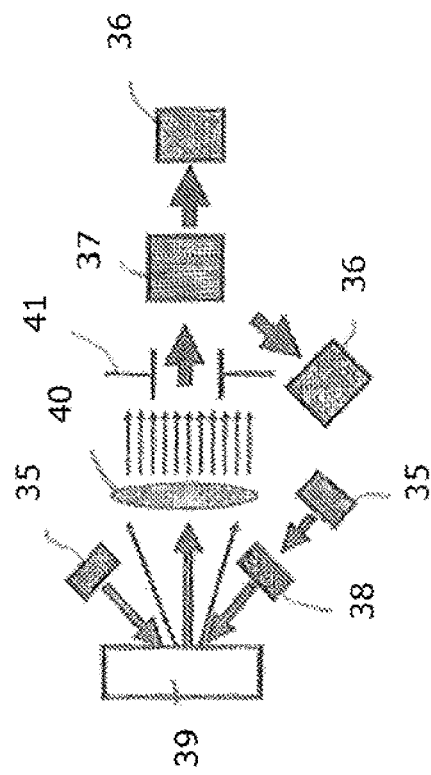
FIG. 1a to FIG. 1d show different optical measurement units (photometers and photometric measurement devices) for obtaining measurement signals from liquid media, according to the prior art.
Figure 1A:
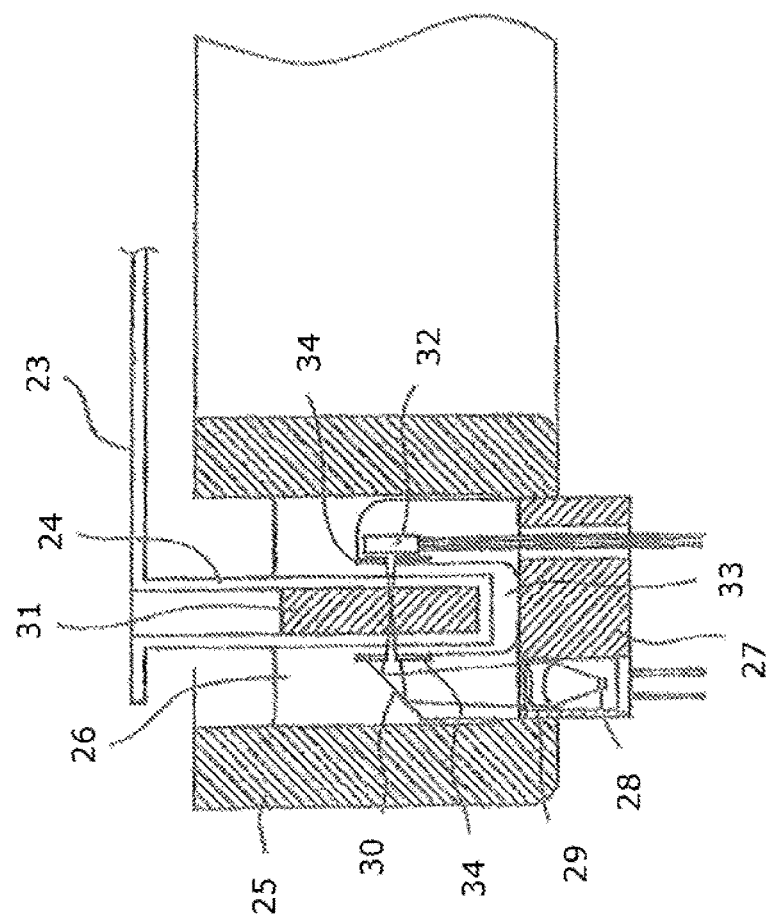
Figure 1D:
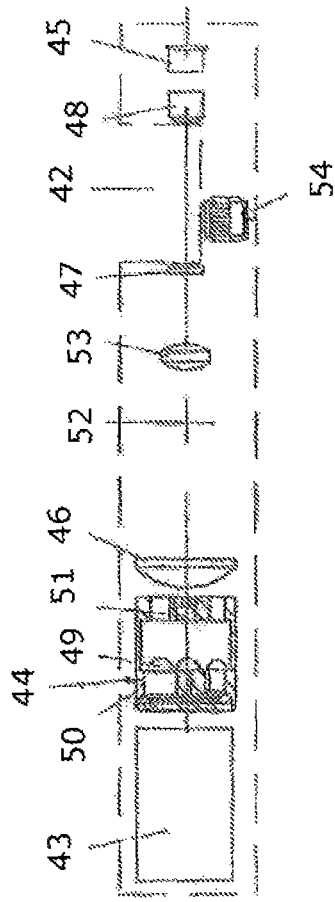
Figure 1C:
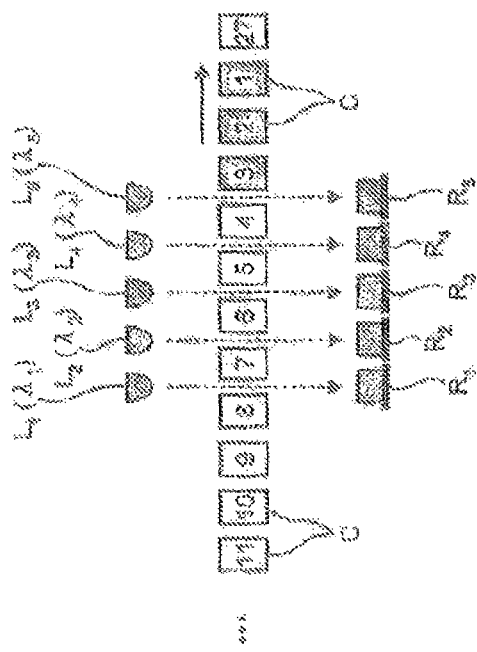

The optical measurement devices shown in FIGS. 1a to 1d are examples pertaining to the prior art and have already been discussed at length in the introductory part of the description above.

Parts which have the same function are provided with the same reference signs in the individual embodiment variants of the invention.

The below-described embodiment variants, according to the invention, of the optical measurement unit 500 for obtaining measurement signals from liquid media which are held in lined-up cuvettes 201 of a stationary (that is to say immovable) cuvette array 200 comprise the following basic elements:

a light-supplying unit 540 for emitting an inlet radiation into the cuvettes 201 of the cuvette array 200, the light-supplying unit 540 having a plurality of LED light sources 541 which emit in a spectrally different manner in the UV/VIS/NIR wavelength range, and a detection unit 550 for detecting a measurement radiation exiting from the cuvettes 201 of the cuvette array 200 and for converting the measurement radiation into an electrical measurement signal, the detection unit 550 being designed such that at least one photodiode 551 is assigned in a fixed and stationary manner to each cuvette 201 of the cuvette array 200.

The first embodiment variant of the optical measurement unit 500 according to the invention, which is shown in FIGS. 2a and 2b and FIGS. 3a to 3d, has at least one stationary light distributor device 542 which distributes the light from the individual LED light sources 541 among the individual cuvettes 201 of the stationary cuvette array 200. In the example shown, the cuvettes 201 are arranged in a straight line, that is to say linearly, but curved or circular arrangements which are stationary would also be conceivable.

The light distributor device 542 has a cavity formed by walls, the inner surfaces 543, 544, 545 of which, as well as the rear wall and the two end surfaces, are designed to be at least partially mirrored and/or diffusely reflective. The light distributor device 542 has, for each LED light source 541, an inlet opening 546 in the bottom surface 545 for feeding the light into the cavity and has, for each cuvette 201 of the cuvette array 200, an outlet opening 547 for feeding the light into the cuvette 201.

According to the invention, the inner surface 544 at the top of the light distributor device 542 that is located opposite the inlet openings 546 of the LED light sources 541 is designed to be corrugated and reflective, wherein the corrugations of the corrugated inner surface 544 are preferably oriented normal to the longitudinal extension of the light distributor device 542 in order to optimally distribute the light entering from the individual LED light sources 541 in the longitudinal direction of the light distributor device 542 (see FIG. 3b).

In order to ensure that the measurement radiation is applied to the cuvettes 201 as homogeneously as possible, the inner surface 543 of the light distributor device 542 at the top part, which is located opposite the outlet openings 547 to the cuvettes 201, is designed to be diffusely reflective (see FIG. 3a). By way of example, barium sulfate ($BaSO_4$) is a suitable material for coating the inner surface 543 in the field of view proceeding from the inlet window 202 of the cuvette 201.

In order to improve the spectral characteristic and to feed the light into the light distributor device 542, at least some LED light sources 541 of the light-supplying unit 540 have optical filters, for example color filters or interference filters. If an interference filter 553 is used, at least one optical element for collimating the light is arranged in the light path on the input side of the interference filter 553.

Figure 2A:
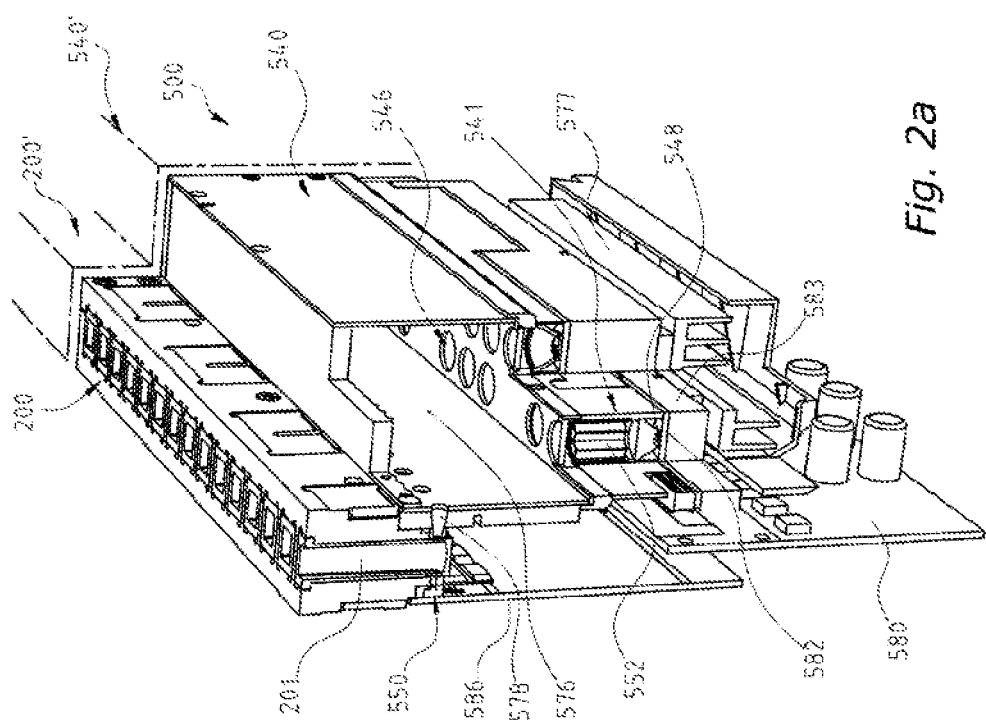
FIG. 2a shows a first embodiment variant of an optical measurement unit according to the invention for obtaining measurement signals from liquid media, in a three-dimensional view, looking toward the light-supplying unit.
Figure 2B:
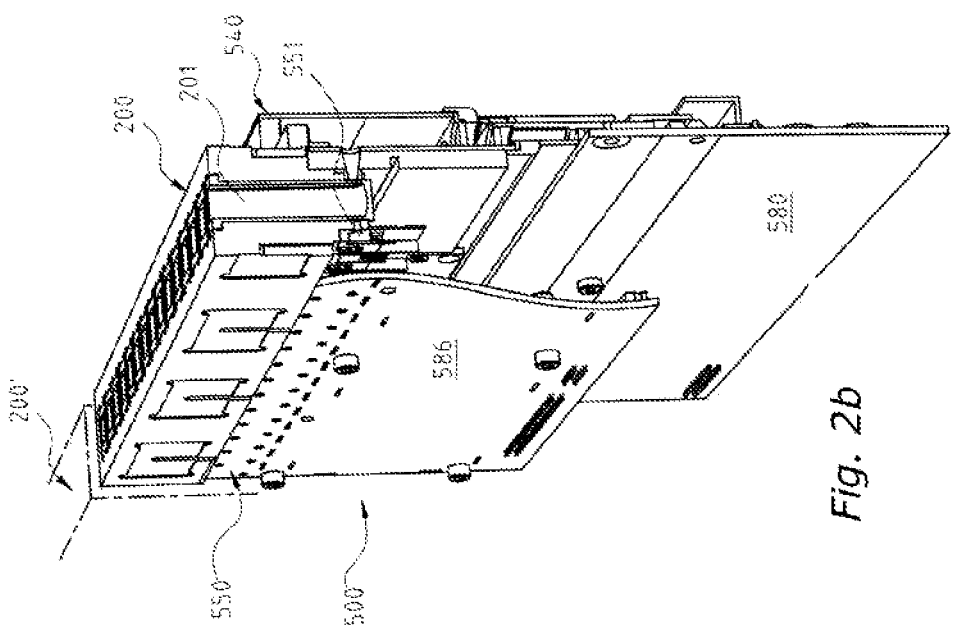
FIG. 2b shows the embodiment variant according to FIG. 2a in a three-dimensional view, looking toward the detection unit.

As shown in FIG. 2a and in the detail in FIG. 3a, the LED light source 541 may have an LED 548, arranged in a TIR lens 549, a tubular body 552 for eliminating non-parallel beam components of the LED, and a narrowband filter, preferably an interference filter 553, on the input side into the light distributor device 542. The radiation (substantially monochromatic light) exiting from the interference filter 553 should in this case have a predetermined bandwidth with a preferred half-width of less than/equal to 10 nanometers, centered on a predetermined wavelength.

In this case, the tubular body 552 may have elongate through-openings 570 extending parallel to the longitudinal axis of the LED light source 541, the walls 571 of said through-openings being made of a light-absorbing material or being coated with such a material (see the detail illustration shown in FIG. 3c). Therefore, within a certain tolerance, only rays which are aligned in parallel reach the interference filter 553, since deviating rays are absorbed by the tubular body 552.

One preferred embodiment variant of the LED light sources 541, which are arranged on the bottom surface 545 of the light distributor device 542, is shown in the sectional illustrations according to FIGS. 3e and 3f. In this variant, a converging lens 590 is arranged on the input side of an interference filter 553, which converging lens aligns in parallel the light emitted by an LED 548 for entry into the interference filter 553, wherein a preferably aspherical diverging lens 591 may be arranged on the output side of the interference filter 553 in order to fan out the radiation entering the light distributor device 542.

Preferably, the light rays are fanned out so far (see marginal rays $S_1$, $S_2$ in FIG. 3f) that the inner surfaces of the light distributor device 542 are illuminated as homogeneously as possible. With particular preference, in the case of a rectangular light distributor device 542 as shown in FIGS. 3e and 3f, the surface 544 that is located opposite the bottom surface 545 is illuminated over as large an area as possible, while the lateral surface 543 is not directly illuminated. In the case of a symmetrical diverging lens 591, the light rays exit in the shape of a cone, as a result of which the surface 544 of the light distributor device that is located directly opposite the LED light source 541 is illuminated in a substantially circular manner (see FIG. 3f, second LED light source from the left, marginal rays $S_3$, $S_4$). In order to enable a largely uniform amount of light to exit from each LED light source 541 of the light distributor device 542 in all outlet windows 547, it is advantageous to illuminate the entire surface 544 as homogeneously as possible by means of an aspherical diverging lens 591 (see FIG. 3f, first LED light source from the left, marginal rays $S_1$, $S_2$). The LED light source 541 on the far right in the diagram shown in FIG. 3f has no diverging lens, so that in this case a parallel ray bundle enters the light distributor device 542. In this case, it is advantageous if the surface 544 located directly opposite is designed to be corrugated and possibly mirrored in order to achieve a better light distribution.

For optimal beam guidance between the light distributor device 542 and the individual cuvettes 201 on the one hand and between the cuvettes 201 and the photodiodes 551 of the detection unit 550 on the other hand, according to the invention channel-like feedthroughs 578 are arranged in the wall of the cuvette receptacle 579 on the entry side of the inlet window 202 and on the exit side of the outlet window 203 of each cuvette 201, said feedthroughs having fittings or modifications which serve to eliminate undesired radiation components $U_1$ of the cuvette inlet radiation exiting from the light distributor device 542 and undesired radiation components $U_2$ of the measurement radiation exiting from the cuvette 201.

By way of example, according to an embodiment variant shown in FIG. 3i, each of the channel-like feedthroughs 578 in the cuvette receptacle 579 may be designed as a channel 594 having a smooth surface, with a diameter smaller than the length of the bore, and thus can screen out the undesired radiation components $U_1$, $U_2$ on the way to the photodiode 551.

In one preferred variant, as shown in FIG. 3h, the channel-like feedthrough 578 may have a clearance 593 or a cavity, in which the undesired radiation components $U_1$, $U_2$ die out.

According to one particularly advantageous variant, as shown in FIG. 3g, the channel-like feedthroughs 578 may have a fluted or toothed structure 592, at which undesired radiation components $U_1$, $U_2$ that have too great an angle deviation from the radiation axis, are blocked or absorbed. This variant can be produced inexpensively in a single component which extends along all the cuvette positions, it being possible for the fluted structure 592 to be realized by means of threaded bores.

The guiding or directing of light in the optical measurement unit takes place in multiple steps in order to meet the requirements:

In the first step, the spatially broadly emitted light from the LEDs 548 is gathered by means of optical lenses, TIR lenses 549 or parabolic mirrors, is parallelized, and is directed toward the interior of the light distributor device 542. Alternatively, as shown in FIG. 3e, the LED 548 may also be arranged at the focal point of the converging lens 590, which aligns the light from the LED 548 in as parallel a manner as possible.

In the (optional) second step, when using a TIR lens, components of the light that have not been sufficiently parallelized are prevented from proceeding further by means of the tubular body 552 or other tube-like elements.

In the third step, optical bandpass filters, for example interference filters 553, are provided in order to obtain a predefined, narrowband, monochromatic light. A diverging lens 591 may optionally be arranged downstream of the interference filter 553 in order to suitably fan out the radiation exiting from the interference filter 553.

In the fourth step, in the interior of the light distributor device 542, the light generated by the individual LED light sources 541 is distributed as homogeneously as possible and is directed into the individual cuvettes 201. To this end, the substantially cuboidal light distributor device 542 is designed such that a diffusely reflective surface 543 is arranged opposite the outlet openings 547 and, with the exception of the inlet and outlet openings, the rest of the inner surfaces are designed to be diffusely reflective and/or mirrored. Preferably, the top surface has a corrugated structure 544 (see FIG. 3b), while the other inner surfaces are preferably flat, so that light over a spectral range from approximately 340 nm to 800 nm is scattered or reflected as effectively as possible. Arranged in the rear wall of the light distributor device 542 are the outlet openings 547, through which the light can pass directly to the inlet windows 202 of the cuvettes 201.

In the fifth step, a ray bundle that is directed into the interior of the cuvette 201 is created by a feedthrough 578, optionally with the interposition of a diaphragm between the light distributor device 542 and the cuvette 201.

In the sixth step, the measurement radiation is directed from the outlet window 203 of the cuvette 201 toward the photodiode 551 of the detection unit 550, optionally with the interposition of a diaphragm.

According to the invention, monitoring or reference detectors 575 are arranged on the light distributor device 542, on the outlet side of through-openings or pinhole diaphragms 576 arranged in a wall, for example in the rear wall, of the light distributor device 542, by which monitoring or reference detectors it is possible to detect fluctuations of the measurement radiation at any time. A pinhole diaphragm 576 together with a reference detector 575 may be assigned to each cuvette 201. If each cuvette 201 is assigned a reference photodiode, these are preferably located at the outlet openings 547 of the light distributor device 542. It is also possible to provide in the light distributor device 542 only two or three pinhole diaphragms 576 together with reference detectors 575 (see FIG. 2a).

As shown in FIGS. 2a/b, the stationary cuvette array 200 may be segmented or divided into multiple sections, wherein a separate light-supplying unit 540 is fixedly assigned to each segment 210.

Each segment 210 is assigned a common light distributor device 542 which extends over the entire length of the segment and which has a sufficient number n of installation positions for LED light sources 541 for up to, for example, 16 optical channels with light of different wavelengths (λ1 to λn). The individual LEDs of the LED light sources 541 may preferably be arranged in the form of an LED array on a common printed circuit board 582, for example made of aluminum. In order to increase the intensity, adjacent installation positions (see FIG. 2a) may be fitted with LED light sources of the same wavelength. In the region of the front inlet window 202 of each cuvette 201, which is adjacent to the light distributor device 542, the light distributor device 542 has a circular opening, the so-called outlet opening 547, through which the light generated by the LEDs is irradiated through the inlet window 202 into the interior of the cuvette 201. The feedthrough 578 in the cuvette receptacle 579, between the outlet opening 547 and the inlet window 202 in the cuvette 201, may also be funnel-shaped, as shown in FIG. 3d, and may optionally contain diaphragms.

The optical feedthroughs 578 in the cuvette receptacle 579 may thus be designed, independently of one another and on both sides of the inlet window 202 and outlet window 203 of the cuvette 201, in a funnel-shaped manner (FIG. 3d), as a channel 594 with a smooth surface (FIG. 3i), with a fluted or toothed structure 592 (FIG. 3g), or with a cavity or clearance 593 located in the channel (FIG. 3h).

As shown in FIG. 3e, different structures (radial clearance 593 on the inlet side of the cuvette 201 and fluted structure 592 on the outlet side of the cuvette 201) may also be combined in a cuvette receptacle 579 in order to eliminate undesired scattered radiation.

Preferably, the walls of the channel-like feedthroughs 578 in the cuvette receptacle 579 are made of a light-absorbing material or are coated with such a material.

By distributing the light within the light distributor device 542 by multiple scatterings and reflections on the inner walls, the light from each optical channel of the LED light sources 541 passes through the circular outlet openings 547 into the inlet window 202 of each associated cuvette 201.

The intensity I of the light transmitted through the cuvettes 201 is measured by means of a stationary array of photodiodes 551 (at least one photodiode per cuvette), which are each placed fixedly behind the rear outlet window 203 of the cuvettes 201, said outlet windows being remote from the light distributor device 542.

Optionally, a second photodiode (not shown) may be arranged on each cuvette 201 at an angle rotated through, for example, 90° from the continuous beam path, in order to carry out nephelometric scattered light measurements.

To ensure a constant ambient temperature of the LED light sources 541, a solid aluminum block 583, which is temperature-controlled (possibility of cooling and heating) for example by means of Peltier components, is mounted on the printed circuit board 582 of the LED light sources 541.

The electronics for the optical measurement unit 500, which are shown schematically in FIG. 4, consist of a plurality of circuit units which are distributed on a plurality of printed circuit boards and which are geometrically placed on the stationary cuvette array 200 (see arrow) according to their function.

In the example shown, the printed circuit board of the transmitting unit 580 contains 16 parallel current sources 581, which are each assigned to a particular light source (LED 548) with a specific wavelength. The current sources 581 may be regulated in terms of current strength and in terms of pulse length by an optical controller (584), so that a desired current pulse in terms of length and strength can be set for the light pulse. The LED power supply voltage can also be individually regulated for each LED channel. For temperature control purposes, the circuit board of the transmitting unit 580 is screwed to an aluminum block 583 having cooling fins 577 (see FIG. 2a) and is regulated by means of Peltier elements to a settable temperature, for example between 29° C. and 41° C. The thermal drift of the current sources 581 can thus be reduced to a minimum. The power loss occurring in the current sources 581 is evened out by the temporally successive actuation. Always only one current source 581 is activated per unit of time, and thus also always only light with a particular, predefined wavelength is generated.

The actual light sources are realized on a separate, cooled aluminum printed circuit board 582 by means of 16 selected LEDs 548 with the desired 16 wavelengths. The aluminum printed circuit board 582 is used on account of the better thermal coupling of the LEDs, is screwed to the aluminum block 583, and thus is also operated at a constant temperature (for example +37° C.). Despite different pulse lengths, the LEDs have a constant average temperature and thus also generate a low spectral shift.

The aluminum printed circuit board 582 having the LEDs is arranged directly on the light distributor device 542 (see FIG. 2a) in order to guarantee the best possible coupling of light into the light distributor device 542. The light from the LEDs 548 is first aligned in parallel via TIR lenses 549 and tubular bodies 552, then is spectrally filtered via optical filters 553, and then is diffusely distributed as uniformly as possible in the interior of the light distributor device 542 so that the light can be coupled out to the 16 cuvettes 201 of the stationary cuvette array at 16 adjacent outlet openings 547 (see arrow 200 in FIG. 4).

A further printed circuit board 585 is equipped with up to 16 monitoring or reference photodiodes 575, which detect the light generated by the LEDs 548 before it passes through the respective cuvette. However, use may also be made of just two global monitoring or reference photodiodes 575. In this case, the light is measured not directly in front of each cuvette but rather at multiple suitable points of the light distributor device 542. Due to the constant geometric conditions, the light in front of each cuvette can be calculated with the aid of a geometry factor.

The printed circuit board 586 of the detector unit 550 is located on the outlet side of the cuvettes of the cuvette array 200. This printed circuit board contains a number of photodiodes 551 corresponding to the number of cuvettes in the segment 210 of the cuvette array 200 (16 photodiodes in the example shown) for the transmitted light exiting from the cuvettes 201. For each cuvette, the detector unit processes two analog values of the two associated photodiodes 551, 575 for transmitted light and monitoring or reference light. For the scattered light measurement (nephelometry), a third analog value can be detected from each cuvette by a photodiode arranged at the side, but the signal path thereof is not shown in FIG. 4 for reasons of clarity.

The two signal paths starting from the photodiodes 551, 575 are synchronously processed by two 16:1 multiplexers 587, inverters, integrators and ADCs, and are converted into a digital measured value. The multiplexers 587 make it possible to select the for example 16 cuvette channels and to switch between these in temporal succession in a configurable order.

Particularly in the case of measurements with high extinction values, light may be attenuated by several decades in the cuvette 201. In the case of high extinction values, the photodiodes 551 are usually operated in the lowest actuation range just above the dark value. The resulting very low photocurrents have a high sensitivity to electrical interference signals of all types. It is therefore of essential importance that the signal from the photodiodes (photocurrent) is amplified in the close spatial vicinity of the detector, the light-sensitive layer, and both the voltage supply and the layout of the circuit are optimized with regard to electrical interference.

The preferred arrangement comprises a compact circuit which is provided on a single printed circuit board 586, said circuit comprising multiple photodiodes 551 of the detection unit 550 lined up next to one another at a distance from the cuvettes 201 of the cuvette array 200, with preamplifiers 589 (preferably transimpedance amplifiers) arranged directly after the electrical outputs of the individual photodiodes 551, followed by low-pass filters, multiplexers, integrators, and 24-bit ADCs. Particular preference is given to photodiodes 551 with a transimpedance amplifier integrated in the housing of the photodiode.

In addition, a cleanly filtered power supply voltage and a correspondingly low-noise reference voltage on the same detector circuit board are of crucial importance for the quality of the measurement signals. Furthermore, the temperature drift of the components must also be kept to a minimum by way of a constantly controlled temperature of the printed circuit board.

If the stationary cuvette array 200 is segmented, and if a separate light distributor device 542 is fixedly assigned to each segment 210 (see FIG. 2a/b), additional printed circuit boards are used for the transmitting unit 580, the printed circuit board for the LEDs 582, the printed circuit board for the monitoring or reference diodes 575 and optionally the printed circuit board for the detector unit 586, said printed circuit boards being indicated in dashed line. By way of example, if 96 cuvettes 201 are arranged in the stationary cuvette array 200, six separate light distributor devices 542 may be provided, each having 16 outlet openings to the fixedly assigned cuvettes 201.

The central printed circuit board 584 for the optical measurement unit 500 is equipped with the optical controller. The optical control unit is realized by a programmable logic (FPGA) as a state machine and can at the same time operate the transmitting unit 580 and the detector unit 586. In order to generate the correct time sequence, the individual light measurements are broken down into light and dark measurements and can be parameterized differently line by line in a configuration memory. The state machine works through these configuration lines in sequence, it also being possible for lines to be skipped. The distinction between light and dark measurements is defined by a flag in the configuration line, as is the desired cuvette channel and the light source. The configuration line also contains the desired delay settings, current strength and pulse length, and also the choice of reference photodiode, LED power supply voltage, oversampling and averaging settings and the period duration.

The detector unit 586 is actuated in a manner synchronized with the transmitting unit 580 and can be set by global parameters with averaging or oversampling settings. The desired integration time, by which the light signal is to be integrated, is also read out from the configuration line. The delay time for the integrator and the integration slope can also be selected here by means of global parameters, so that the settling times of the measurement signal and the integration speed can thus be switched over.

The analog measured value is thus selected from the corresponding photodiode 551 with transimpedance amplifier via the multiplexer 587 and is measured by means of an inverter and an integrator and an optional logarithmic amplifier and is digitized by a high-resolution ADC measurement with or without oversampling. Finally, if a scattered light measurement also takes place, three analog measured values (transmitted light, monitoring or reference light, scattered light) are digitized simultaneously by three ADCs and are stored line by line in the internal memory as raw measured values. It is essential that the measurement of transmitted light and monitoring or reference light and optionally scattered light takes place simultaneously.

The internal memory contains all the raw data and is cyclically read by the evaluation processor by means of software and is converted by a conversion algorithm into a final measured value. The conversion takes into account the dark value and the light value and also the $I_0$ measurement and the $I_1$ measurement before and after the reagents have been admixed. The change in the measured values over time can also be detected through successive measurements. It is essential that the measurements take place periodically and give rise to a repeatable measurement cycle according to the set period duration.

For each cuvette, the calculated data are packed into defined data packets and are transmitted to the main computer 588 by means of a local Ethernet interface. By virtue of this data reduction, it is possible to process and to transfer to the main computer 588 all the cuvettes of the cuvette array 200 of the optical measurement unit 500.

In the measurement method, it is possible to measure I or $I_0$ in rapid succession for each cuvette with a high sampling frequency (>1 Hz). There are various possibilities for actuating and reading the multiple LED light sources 541 and photodiodes 551 of the detection unit 500.

The periodic actuation signal for the individual LED light sources 541 is defined, with regard to the pulse duration and integration duration and also the current level used, for each combination of cuvette and wavelength for the measurement mode used and is not changed during operation.

In the example shown, the actuation of 16 LED light sources 541 takes place via 16 separate current sources 581 and the associated hardware. The exposure of each cuvette to each spectral channel of the LED light sources 541 and the integration times used are individually defined (16×16 combinations). The individual LEDs (or in some positions also multiple LEDs in order to increase the intensity) each sequentially emit one light pulse in the course of one measurement cycle, said light pulse being reflected multiple times on the inner walls in the interior of the light distributor device 542 and finally reaching the 16 associated cuvettes 201 through the 16 outlet openings 547 (see FIG. 3a).

Various measurement modes are provided:
Mode 1: Detection of the dynamic flashing LED signal with constant integration time and variable current strength and pulse duration (256 flashes)
Mode 2: Detection of the static LED signal with variable integration time (256 LED actuations) and variable current strength
Mode 3: Detection of the static LED signal with variable integration time (16 LED actuations)

The measurement takes place individually for each combination of cuvette and wavelength, one light pulse being generated for each measurement point in modes 1 and 2.

Figure 5B:
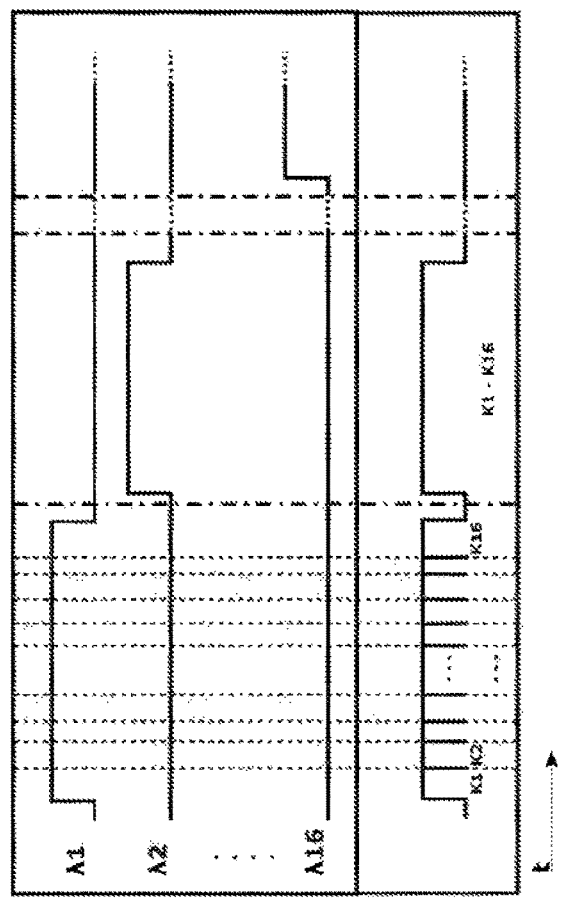
FIG. 5b shows a second diagram to illustrate a measurement process (mode 3)
Figure 5A:
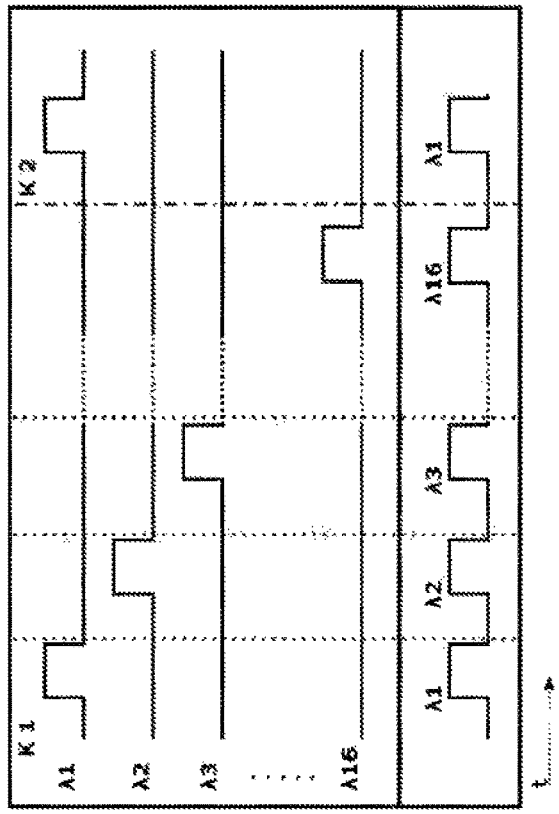

As shown in FIG. 5a, the spectral channels ($\lambda 1 \ldots \lambda 16$) of the individual LED light sources 541 are activated and deactivated in a set order in modes 1 and 2. The resulting light flashes are detected and measured by the photodiode 551 selected by the multiplexer 587. After running through all the spectral channels, the sensors are changed over from the cuvette position K1 to the cuvette position K2 and the light flashes required for the latter are generated in the same order. After fully running through all 16 cuvette positions (that is to say 16×16 light flashes), one sampling is complete and the next one can be initiated. By virtue of this process, up to four samplings per second can be achieved. In modes 1 and 2, alternating dark and light measurements are carried out one after the other, so that in total 512 individual measurements are carried out per sampling.

The measurement method according to modes 1 and 2 is thus characterized in that the spectral channels $\lambda 1 \ldots \lambda n$ of the individual LED light sources 541 are activated and deactivated in a predefined order, wherein in each case the photodiode 551 arranged in a first cuvette position K1 is detected, and in that, after running through all the spectral channels in the first cuvette position K1, a changeover to the next cuvette position K2 takes place. The time duration for one cycle in measurement mode 1 or 2 is >=0.25 seconds.

In measurement mode 3, which is shown schematically in FIG. 5b, the LED light sources 541 are switched in a different order than in mode 1 or 2.

Each LED light source 541 or each spectral channel is switched on only once in the cycle (indicated by the dash-dotted line), and thereafter all 16 cuvettes are measured one after the other, with no dark measurement taking place between these individual measurements. The first cuvette K1 is measured with a delay, so that the associated photodiodes 551 of the detector unit 550 have sufficient time to settle. The other cuvettes K2 to K16 can be measured more rapidly in succession without any additional settling time.

Within one cycle, each LED is switched on only once, with all 16 cuvettes being measured in each case. If a dark measurement is necessary, a dark value is measured once, for example at the start or end of the cycle for measuring the 16 cuvettes.

In the case of 16 wavelengths or 16 spectral channels ($\lambda 1 \ldots \lambda 16$) and 16 cuvette positions, 16×16 light measurements are required. If the 16 dark measurements (once per cycle) are added, this results in 272 individual measurements. The time duration for one cycle in measurement mode 3 is >=0.5 seconds.

The measurement method according to mode 3 is characterized in that the spectral channel $\lambda 1$ of the first LED light sources 541 is activated, with the photodiodes 551 arranged in the cuvette positions K1 . . . Km being detected in a predefined order, wherein, after running through all the cuvette positions K1 . . . Km, the next spectral channel $\lambda 2$ of the next LED light sources 541 is activated.

Advantage of Mode 3:
Mode 3 is on the whole faster than the 512 dark/light measurements carried out in an alternating manner in mode 1 and mode 2, because overall fewer measurements and fewer settling times are required for the photodiodes.
The settling time of the photodiodes need only be taken into account prior to the first light measurement of the cuvette K1; the remaining 15 cuvettes K2 to K16 can follow immediately thereafter.
On the whole, therefore, much shorter sampling times per cycle are achieved compared to mode 1 or 2.

Figures 6A, 6B:
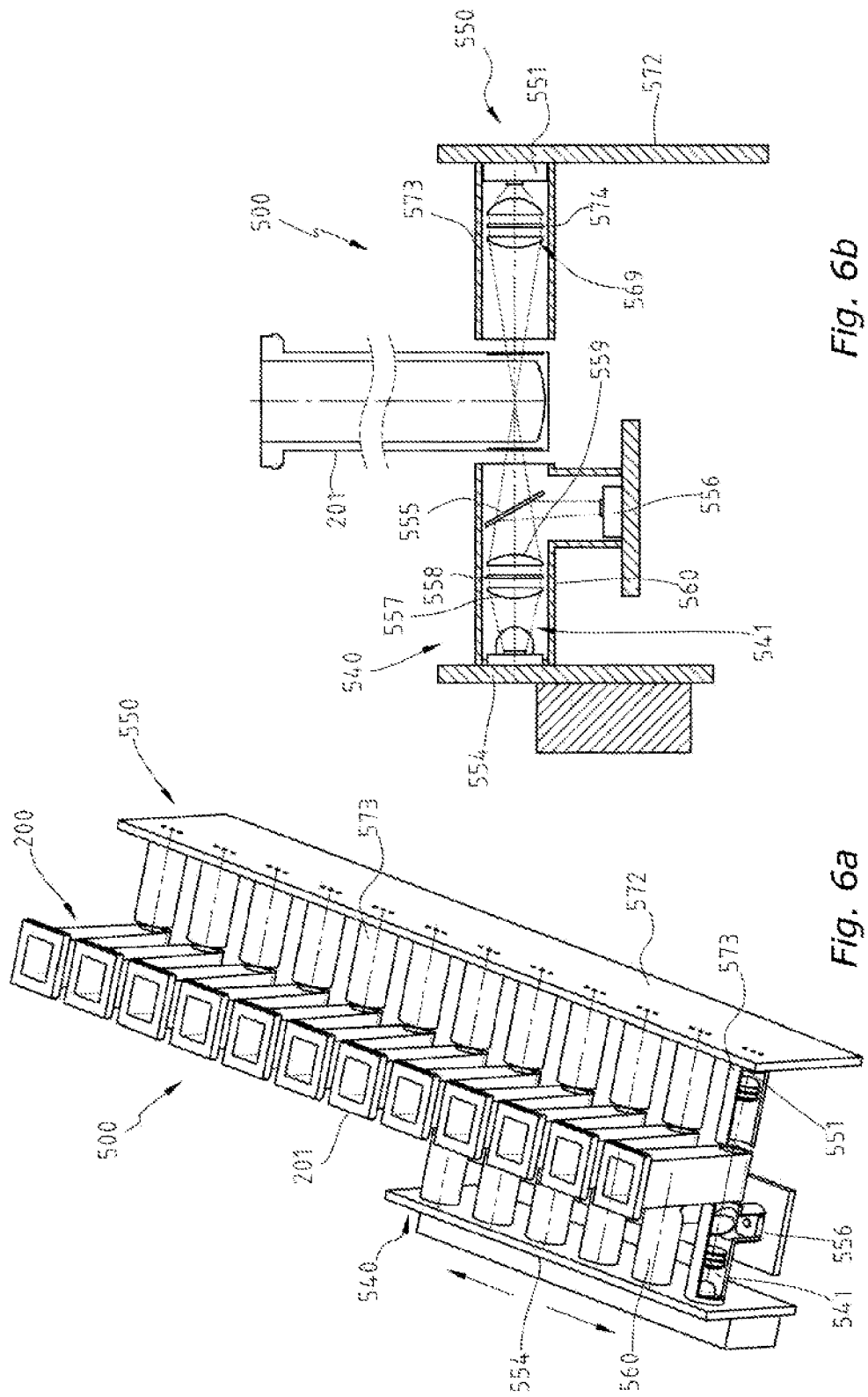
FIG. 6a shows a second embodiment variant of an optical measurement unit according to the invention for obtaining measurement signals from liquid media, in a three-dimensional view.
FIG. 6b shows an enlarged sectional illustration through the axis of a cuvette, normal to the cuvette array.

In the second embodiment variant of the optical measurement unit 500 according to the invention, which is shown in FIGS. 6a and 6b, the light-supplying unit 540 has at least one unidimensional, rod-shaped light source array 554 comprising a plurality of LED light sources 541, which light source array is oriented along the stationary cuvette array 200, for example of an analysis device, and is designed to be movable along the stationary cuvette array 200. Each LED light source 541 of the light source array 554 can thus be assigned to each cuvette 201 of the stationary cuvette array 200.

In this embodiment variant, preferably in each case one LED light source 541 is arranged together with a beam splitter 555 and a reference detector 556 in a common, for example tubular, housing 560. The light paths of the individual LED light sources 541 arranged next to one another can thus be separated.

Individual LED light sources 541 of the rod-shaped light source array 554 may have collimating optical elements 557 for feeding the light into the cuvettes 201 and a narrowband filter 558 for improving the spectral characteristic of the light. In addition, a condenser, preferably a converging lens 559, may be provided for focusing the light into the cuvette 201.

If individual LED light sources 541 are designed as narrowband-emitting and parallel-light-emitting laser diodes, the optical elements 557 for collimation, for filtering 558 and for focusing 559 may be omitted entirely or at least in part.

The photodiodes 551 of the detection unit 550 which are fixedly assigned to the individual cuvettes 201 of the stationary cuvette array 200 are preferably arranged as a photodiode array on a common circuit board 572. The detection unit 550 has—coming from each cuvette 201 of the stationary cuvette array 200—a receptacle 573 which is for example tubular and in which—if necessary—optical elements 569 for focusing the measurement radiation onto the photodiode 551 and—if necessary—a filter element 574 are arranged.

With this module variant, various photometric and turbidimetric measurements can be carried out on multiple cuvettes 201 of a stationary, linear cuvette array 200 at single and/or multiple wavelengths in the wavelength range of ultraviolet and visible light, wherein the individual LED light sources 541 of different wavelengths of the light-supplying unit 540 are successively positioned in front of the individual cuvettes 201. The intensity of the light that has passed through the respective cuvette 201 is then measured in each case by the fixedly assigned, stationary detector unit 550. As an alternative to the positioning, a measurement "on the fly", that is say while moving past, is also possible.

In the third embodiment variant of the optical measurement unit 500 according to the invention, which is shown in FIGS. 7a, 7b and 7c, the LED light sources 541 of the light-supplying unit 540 are arranged as a 2D LED array 561, wherein a stationary 2D LED array 561 is fixedly assigned to each cuvette 201 of the stationary cuvette array 200. In this embodiment variant, in a manner similar to the first embodiment variant, no relative movement takes place between the cuvettes 201 of the cuvette array 200 on the one hand and the light-supplying unit 540 and the detection unit 550 on the other hand, as a result of which the measurement processes can be significantly accelerated due to the omission of mechanical movements within the optical measurement unit 500.

According to one sub-variant of the third embodiment variant, the LED light sources 541 in the light-supplying unit 540 may be arranged as a single 2D LED array 561 (as in the detail illustration shown in FIG. 7c), wherein the light-supplying unit 540 is designed to be movable along the entire stationary cuvette array 200 or along a segment 210 of the cuvette array 200 (in a manner similar to what is shown in FIG. 6a), such that the 2D LED array 561 can be assigned to each cuvette 201 of the cuvette array 200 or to each segment 210 of the cuvette array 200. If the cuvette array 200 is segmented, a light-supplying unit 540 having a 2D LED array 561 is provided for each segment 210.

In order to feed the light from the individual LEDs 548 of the 2D LED array 561 into the cuvettes 201, a 2D lens array 562 for collimating the light from the individual LEDs is provided. In addition, a 2D filter array 563 for narrowband filtering of the light is arranged in the beam path in order to improve the spectral characteristic.

The filter array 563 may have no filter function in some positions, for example if a narrowband- and parallel-emitting laser diode is arranged in this position of the 2D LED array 561.

Also provided in the beam path is at least one condenser, preferably a converging lens 564, for focusing the light into the individual cuvettes 201.

Particular preference is given to embodiment variants in which the 2D LED array 561 consists of LED emitters bonded to a single substrate 565, wherein the 2D lens array 562 is a 2D microlens array and the 2D filter array 563 is a 2D microinterference filter array.

In each case one LED light source 541, comprising a 2D LED array 561, a 2D lens array 562, a 2D filter array 563 and a converging lens 564, may preferably be arranged together with a beam splitter 566 and a reference detector 567 in a common housing 568.

In this variant, each cuvette 201 has an individual photometer unit consisting of a light-supplying unit for light with up to 9, 12 or 16 different wavelengths ($\lambda 1$ to $\lambda n$) which are generated by individual LEDs 548. When using commercial LEDs (side length approximately 2 mm and a spacing of approximately 0.5 mm) which are soldered to a circuit board by means of push-through mounting, a surface area of approximately $10\times10$ mm$^2$ is to be expected in the case of a 4×4 array.

When arranging the semiconductors of the individual LEDs as a COB (chip on board), these can be realized on a space-saving surface area of less than $5\times5$ mm$^2$. In the case of COB technology, the LED chips are preferably bonded directly to a highly thermally conductive aluminum circuit board.

With an edge length of 300 to 900 μm and a spacing of approximately 100 μm, 16 LED chips for example can be accommodated on a square surface area having an edge length of 1.6 to 4 mm. The individual collimator lenses of the 2D microlens array and also the interference filters of the 2D interference filter array accordingly have diameters of up to 900 μm. In order to further improve the collimation (parallelization), a pinhole diaphragm array may be placed onto the LED array so that the light-emitting areas can be presented in a sufficiently punctiform manner regardless of the size of the emitting semiconductor surfaces.

The LED chips may be arranged on the 2D array in columns or rows, for example 3×3, 3×4 or 4×4, or also in concentric circles.

As already described in connection with the variant shown in FIG. 6a/b, the detection unit 550 has, coming from each cuvette 201 of the stationary cuvette array 200, a receptacle 573 which is for example tubular and in which optical elements 569 for focusing the measurement radiation onto the photodiode 551 and—if necessary—a filter element 574 are arranged.

The photodiodes 551 of the detection unit 550, which are fixedly assigned to the individual cuvettes 201, are preferably arranged as a photodiode array on a common circuit board 572.

The invention claimed is:

1. An optical measurement unit for obtaining measurement signals from liquid media which are present in cuvettes lined up next to one another, each cuvette having a lateral inlet window and at least one lateral outlet window, the optical measurement unit comprising:

a light-supplying unit configured and arranged for emitting spectrally different inlet radiations in temporal succession directly into the lateral inlet window of each cuvette, the light-supplying unit having a plurality of LED light sources which emit in a spectrally different manner in the UV/VIS/NIR wavelength range, wherein the light-supplying unit further includes at least one stationary light distributor device configured and arranged to distribute the light from the plurality of LED light sources among the cuvettes, wherein the at least one stationary light distributor device has a cavity, the inner surfaces of which are at least partially mirrored and/or diffusely reflective, and wherein the at least one stationary light distributor device includes, for each of the plurality of LED light sources, an inlet opening configured and arranged for feeding the light into the cavity, and wherein the at least one stationary light distributor device has, for each cuvette of the cuvette array, an outlet opening for feeding the light into the cuvette, and a detection unit configured and arranged for detecting a measurement radiation exiting from the at least one outlet window of each cuvette and for converting the measurement radiation into an electrical measurement signal, wherein the cuvettes lined up next to one another form a stationary cuvette array, and the detection unit includes a plurality of photodiodes, wherein-to each outlet window of each cuvette of the cuvette array is assigned at least one of the plurality of photodiodes.

2. The optical measurement unit according to claim 1, wherein the plurality of photodiodes are arranged on a common circuit board at a distance from the cuvettes of the stationary cuvette array, wherein a preamplifier is arranged within each of the plurality of photodiodes or directly at the signal output of each photodiode.

3. The optical measurement unit according to claim 1, wherein the inner surface (543) of the at least one stationary light distributor device (542) that is located opposite the outlet openings (547) to the cuvettes (201) is designed to be diffusely reflective.

4. The optical measurement unit according to claim 1, wherein the inner surface of the at least one stationary light distributor device is located opposite the inlet openings of the plurality of LED light sources, and the inner surface is corrugated and reflective.

5. The optical measurement unit according to claim 1, wherein, in order to improve the spectral characteristic of the optical measurement unit, at least some of the plurality of LED light sources include optical filters.

6. The optical measurement unit according to claim 5, wherein the optical filter is at least one narrowband interference filter, and further includes at least one optical element configured and arranged for collimating the light and is arranged in the light path on the input side of the at least one narrowband interference filter.

7. The optical measurement unit according to claim 5, wherein at least one of the plurality of LED light sources are configured and arranged to collimate the emitted light via an LED arranged in a TIR lens.

8. The optical measurement unit according to claim 5, further including a tubular body configured and arranged for eliminating non-parallel beam components, the tubular body is arranged in the light path on the input side of the optical filter, wherein the tubular body includes through-openings parallel to the longitudinal axis thereof, walls of said through-openings including a light-absorbing material or are coated with a light-absorbing material.

9. The optical measurement unit according to claim 6, further including a converging lens arranged on the input side of the interference filter, the converging lens configured and arranged to align in parallel with the light emitted by at least one of the plurality of LED light sources.

10. The optical measurement unit according to claim 9, further including a diverging lens arranged on the output side of the interference filter, the diverging lens configured and arranged to fan out the radiation entering the at least one light distributor device.

11. The optical measurement unit according to claim 1, further including feedthrough channels arranged in a wall of a cuvette receptacle on the entry side of the inlet window and on the exit side of the outlet window (203), said feedthrough channels having fittings or modifications which are configured and arranged to eliminate undesired radiation components of the inlet radiation exiting from the at least one light distributor device and of the measurement radiation exiting from the cuvette.

12. The optical measurement unit according to claim 11, wherein the fittings or modifications of the feedthrough channels in the cuvette receptacle of each cuvette are designed (1) as a channel having a smooth surface with a diameter smaller than the length, or (2) as a feedthrough having a cavity or a clearance, or (3) as a feedthrough having a fluted or toothed structure.

13. The optical measurement unit according to claim 11, wherein the walls of the feedthrough channels in the cuvette receptacle consist of a light-absorbing material or are coated with a light-absorbing material.

14. The optical measurement unit according to claim 1, further including reference detectors arranged on the at least one light distributor device on the outlet side of through-openings or pinhole diaphragms arranged in a wall of the at least one light distributor device.

15. The optical measurement unit according to claim 1, wherein the stationary cuvette array is segmented, and the optical measurement unit further includes a separate light-supplying unit fixedly assigned to each segment of the stationary cuvette array.

16. The optical measurement unit according to claim 1, wherein the light-supplying unit has at least one unidimensional, rod-shaped light source array including a plurality of LED light sources, the light source array is oriented along the stationary cuvette array and is movable along the stationary cuvette array such that each of the plurality of LED light sources of the light source array are configured and arranged to be assigned to each cuvette of the stationary cuvette array.

17. The optical measurement unit according to claim 16, wherein one of the plurality of LED light sources is arranged together with a beam splitter and a reference detector in a common housing.

18. The optical measurement unit according to claim 16, wherein—at least some of the plurality of LED light sources of the rod-shaped light source array have optical elements configured and arranged for collimation purposes, a narrowband filter, and a condenser configured and arranged for focusing the light into the cuvette, wherein the optical elements, the narrowband filter and the condenser are configured and arranged to improve the spectral characteristic and to feed the light into the cuvettes.

19. The optical measurement unit according to claim 1, wherein the plurality of LED light sources are arranged as a 2D LED array fixedly assigned to each cuvette of the stationary cuvette array.

20. The optical measurement unit according to claim 1, wherein the plurality of LED light sources are arranged as a single 2D LED array, wherein the light-supplying unit is configured and arranged to be movable along the stationary cuvette array or a segment of the cuvette array such that the single 2D LED array can be assigned to each cuvette of the cuvette array or of a segment of the cuvette array.

21. The optical measurement unit according to claim 19, further including a 2D lens array configured and arranged for collimating the light from the individual LEDs, a 2D filter array configured and arranged for narrowband filtering of the light, and at least one condenser, the 2D lens array, 2D filter array and the at least one condenser configured and arranged to improve the spectral characteristic and to feed and focus the light from the individual LEDs of the 2D LED array into the cuvettes of the cuvette array.

22. The optical measurement unit according to claim 21, wherein the 2D LED array consists of LED emitters bonded to a single substrate, and wherein the 2D lens array is a 2D microlens array and the 2D filter array is a 2D microinterference filter array.

23. The optical measurement unit according to claim 21, wherein in each case one LED light source includes a 2D LED array, a 2D lens array, a 2D filter array and a converging lens, and each of the LED light sources is arranged together with a beam splitter and a reference detector in a common housing.

24. The optical measurement unit according to claim 16, wherein the detection unit has, coming from each cuvette of the stationary cuvette array, a receptacle with optical elements configured and arranged for focusing the measurement radiation onto the photodiode.

25. An optical measurement method for obtaining measurement signals from liquid media, comprising the following steps:

holding the liquid media in cuvettes which are lined up next to one another and which form a stationary cuvette array, supplying an inlet radiation, which radiates into the cuvettes, by means of at least one stationary light distributor device which optically contacts at least one segment of the cuvette array, wherein light is irradiated into the at least one stationary light distributor device in temporal succession by a plurality of LED light sources which emit in a spectrally different manner in the UV/VIS/NIR wavelength range, wherein the spectral channel of the first LED light sources is activated, with the photodiodes arranged in the cuvette positions being detected in a predefined order, and in that, after running through all the cuvette positions, the next spectral channel of the next LED light sources is activated, and detecting the radiation exiting from the cuvettes by means of at least one photodiode, fixedly assigned to each cuvette, of a stationary detection unit.

26. The method according to claim 25, wherein the spectral channels of the individual LED light sources are activated and deactivated in a predefined order, wherein in each case the photodiode arranged in a first cuvette position is detected, and in that, after running through all the spectral channels in the first cuvette position, a changeover to the next cuvette position takes place.

27. The method according to claim 26, wherein after each deactivation of one of the LED light sources, a dark measurement is carried out on the respective photodiode.

28. The method according to claim 25, wherein prior to any changeover to the next spectral channel, a dark measurement is carried out on the respective photodiode.

* * * * *